Patented May 11, 1954

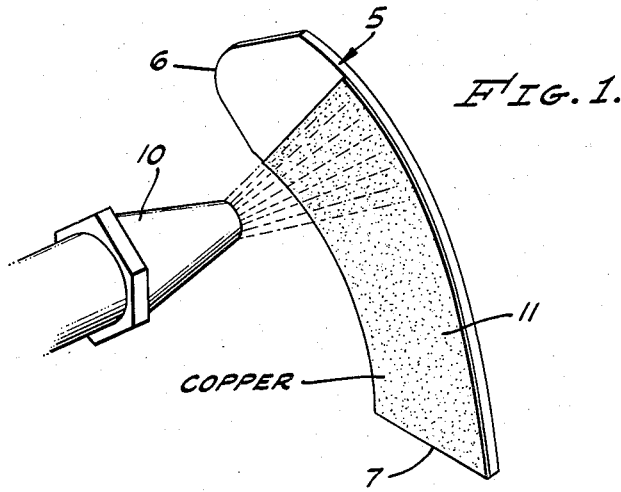
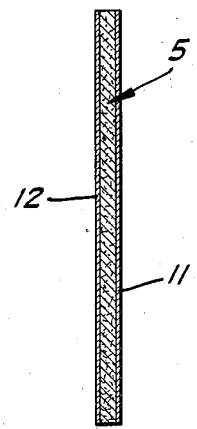
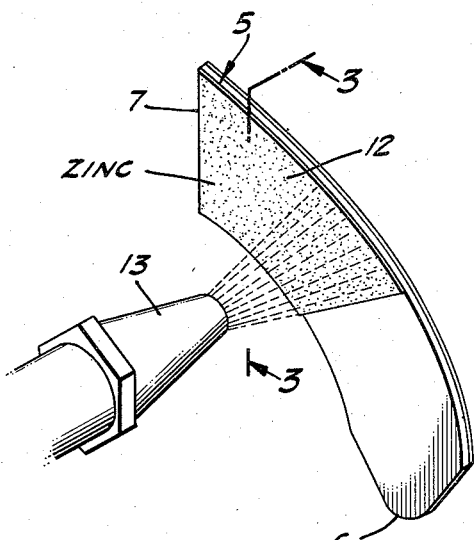
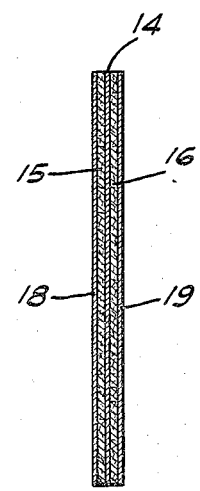

2,678,342

UNITED STATES PATENT OFFICE 2,678,342

PRIMARY BATTERY UNIT WITH SPRAYED METALLIC ELECTRODES

Donald C. Porter, Bakersfield, Calif.

Application June 5, 1952, Serial No. 291,859

5 Claims. (Cl. 136—91)

This invention relates to an electrical element, and particularly to an electrode unit for a primary battery.

In co-pending application, Ser. No. 291,860, filed June 5, 1952, a toy having an electrically driven movable element has been disclosed and claimed. The movable element is driven by electrical energy derived from a cell using the juice of acid bearing fruits and vegetables, such as lemons, grapefruit, etc., as an electrolyte. An electrode unit constructed in accordance with the present invention is inserted in these acid sources or in the natural or synthetic juices thereof. The electrode has been found to be particularly efficient and economical to manufacture, so that it may be replaced at small cost.

The principal object of the invention, therefore, is to provide an improved electrode unit or cell to be operated in the natural or synthetic juices of acid bearing fruits and vegetables.

Another object of the invention is to provide an electrode unit which may be economically manufactured and easily inserted within fruits and vegetables.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a perspective view showing the electrode unit being coated with one electrode.

Fig. 2 is a perspective view showing the electrode unit being coated with a second electrode.

Fig. 3 is a cross-sectional view taken along the line 3—3 of Fig. 2, and

Fig. 4 is a cross-sectional view showing another modification of the electrode unit embodying the invention.

Referring now to the drawings, in which the same numerals identify like elements, the electrode unit is formed with a central sheet 5 of porous material such as filter or blotting paper or other types of porous sheets of comparable thickness. This material is cut to form a curved strip with a rounded point section 6 and a beveled end section 7 for the purpose of facilitating the insertion of the unit into a lemon or similar fruit, so that one end of the unit is positioned in the lower portion of the fruit. It is understood that the electrode unit may be made in any other shape desired.

In Fig. 1, one side of the paper 5 is shown being coated with metallic copper sprayed thereon by a nozzle 10. The spraying is accomplished by simply melting a copper rod and blowing the copper particles onto the paper with air pressure.

In Fig. 2, the paper 5 is shown being sprayed with metallic zinc by the nozzle 13, the zinc being melted and blown thereon as a fine spray. The final copper coat is shown at 11 and the zinc coat is shown at 12. Although copper and zinc are shown, other metals such as silver, aluminum, etc., may be used as long as a potential difference is generated between them when placed in acid. The resulting roughened surface exposes more metal to the electrolyte, thus increasing the ampere output for a given size of electrode unit.

To increase the life of the battery formed by the acid and the electrodes, a light coat of manganese dioxide may be sprayed on the filter paper or the paper impregnated therewith prior to the spraying of the zinc and copper coatings thereon to absorb the gases liberated during the generation of current.

Referring now to Fig. 4, an electrode unit structure is shown wherein a light coat of powdered manganese dioxide layer 14 is first applied to two filter or blotting paper layers 15 and 16. These surfaces are then placed in contact, after which the zinc and copper layers 18 and 19, similar to layers 11 and 12, are then applied. If a larger output is desired, the units may be duplicated and paralleled as is well-known in the art.

The electrode units above described are rugged, efficient, and particularly economical to manufacture. Instead of first cutting the paper into the desired final shape of the electrodes, a large sheet of paper may be coated, from which the final form of the unit may be cut. The sprayed coats form a channel in which the paper functions as a wick to liberate gases and produce a flow of the electrolyte up from the bottom of whatever supplies the electrolyte.

I claim:

1. An electrode unit comprising a central layer of porous paper, one side of which has been sprayed with molten zinc particles to form a layer of zinc and the other side of which has been sprayed with molten copper particles to form a layer of copper, said zinc and copper layers generating an electrical potential between them when immersed in an acid, and a thin layer of manganese dioxide between said zinc layer and paper and between said copper layer and paper.

2. An electrode assembly comprising a plurality of layers of zinc obtained by spraying molten particles thereof, a plurality of layers of copper obtained by spraying molten particles thereof and a plurality of layers of porous paper separating said zinc and copper layers.

3. An electrode unit having a pair of central layers of porous paper slightly separated by a thin layer of manganese dioxide, a layer of zinc obtained by spraying molten particles on the outer surface of one paper layer and a layer of copper obtained by spraying molten particles on the outer surface of said other paper layer, said zinc and copper layers generating an electrical potential between them when immersed in an acid.

4. An electrode unit comprising a central layer of porous paper, having each surface thereof lightly impregnated with manganese dioxide, one side of said paper layer having a layer of zinc obtained by spraying molten particles thereon and the other side of said paper layer having a layer of copper obtained by spraying molten particles thereon, said zinc and copper layers generating an electrical potential between them when immersed in an acid.

5. An electrode unit comprising a central layer of porous paper, on one side of which is a layer formed by sprayed molten zinc particles and on the other side of which is a layer formed by sprayed molten copper particles, said zinc and copper layers generating an electrical potential between them when immersed in an acid.

References Cited in the file of this patent

UNITED STATES PATENTS

| Number | Name | Date |
|---|---|---|
| 405,196 | Barrett | June 11, 1889 |
| 2,536,697 | Ruben | Jan. 2, 1951 |

FOREIGN PATENTS

| Number | Country | Date |
|---|---|---|
| 399,561 | Great Britain | Oct. 9, 1933 |